Dec. 1, 1942.  D. M. SMITH ET AL  2,303,665

PACKING RING

Filed Jan. 6, 1940

INVENTORS;
DALLAS M. SMITH
WALTER C. KNOEBEL

By J. Henry Kinealy
ATTORNEY

Patented Dec. 1, 1942

2,303,665

UNITED STATES PATENT OFFICE 2,303,665

PACKING RING

Dallas M. Smith and Walter C. Knoebel, Kirkwood, Mo., assignors to McQuay-Norris Manufacturing Company, St. Louis, Mo., a corporation of Delaware Application January 6, 1940, Serial No. 312,755

6 Claims. (Cl. 309—29)

Our invention relates to packing rings and more particularly to packing rings comprised of a number of ring members usually formed of steel and adapted for use on a piston or other similar part so that an effective seal may be obtained between the piston and the cylinder in which it reciprocates.

Heretofore, packing rings of this type as adapted particularly for use in internal combustion engines, had a number of deficiencies. Some rings were constructed so the ring members could rotate relatively to each other about the ring axis to prevent carbon formation between the ring members and the ring grooves. However, this rotation of the ring members relative to each other was not limited and as the piston reciprocated in the cylinder the gaps in the ring members became aligned so as to make a passage along the cylinder wall and allow resultant blowby of gases and pumping of oil, and, therefore, to prevent an effective seal between the piston and cylinder.

If the rings were provided with means to prevent movement of the ring members relative to each other and to prevent the subsequent aligning of the ring gaps, the ring members could not rotate relative to each other and, because movement of one ring member necessitated movement of all of the ring members, any benefits ordinarily acquired by forming a packing ring of individual ring members were nullified since the assembled ring members expanded and contracted radially as a unit instead of individually. This unitary action of the ring members permitted carbon to form therebetween and the assembled ring members froze on the piston and no longer expanded and contracted radially to conform to any irregularities in the shape of the cylinder in which the piston reciprocated. Furthermore, since the ring members could not expand and contract individually, they could not provide an effective seal for pistons operating in slightly irregularly shaped cylinders even before any carbon formed.

Also, packing rings formed of a plurality of individual ring members, as described above, in the past could not be used effectively as oil rings because the flat ring members nested so close to one another that the adjacent members were in firm contact and, therefore, oil collected on the cylinder wall could not pass rearwardly through the ring structure to be drained from the ring groove through suitable ports or openings leading to the interior of the piston. Particularly in internal combustion engines of modern design it is necessary to have at least one oil ring on each piston, and in an effort to combine the efficiency of a laminated packing structure comprised of steel ring members with an oil ring structure having openings therethrough, attempts have been made to provide two thin steel rings separated by an ordinary cast iron spacer ring through which spacer ring slots or holes for the passage of oil were provided. However, such a composite structure of iron and steel had serious defects in operation.

It has been known for some time that a flat ring member dishes slightly, that is, a surface thereof is either convex or concave, when a radial force is exerted thereon, as by contracting the ring member in a cylinder, but unless some special precaution is taken it is impossible to maintain the dish in the same direction when the ring member is in operation on a piston reciprocating in a cylinder. As the piston reciprocates in the cylinder, the direction of dish changes with each change of direction of movement of the piston. This constant change of direction of dish creates a pumping action which permits leakage of liquids and gases past the piston and causes excessive wear on the cylinder. In order that the rings could not change continually their direction of dish and in order to eliminate the resulting difficulties, the ring members were formed pre-dished so that on contracting the ring members in a cylinder the dishing effect would increase. A ring member of this kind eliminated the change of direction of dish as encountered by flat rings, but the added dishing on contraction distorted the ring member to such an extent that it would not operate satisfactorily.

In order to overcome the difficulties mentioned above, our invention contemplates the construction of a piston packing comprised of ring members which may rotate about the ring axis relative to each other so that carbon formation is prevented and in which the ring members are permitted to rotate relative to each other through a limited distance only so that the gaps therein cannot become aligned and permit leakage of liquids and gases past the piston as it reciprocates in the cylinder. Also, our invention contemplates the construction of a ring member which dishes, when contracted, in a predetermined direction and remains dished in that same direction when in operation on a piston reciprocating in a cylinder. In its broadest concept our invention contemplates obtaining these results by unbalancing the cross section of the ring member about a plane parallel to the plane of the ring member and dividing the ring member into sections of equal thickness. The two halves of the ring divided by the imaginary plane are unbalanced when the two halves of the ring member are unsymmetrical about this plane. In its narrower concept, our invention includes unbalancing the ring member by forming protuberances on surfaces thereof, the number of protuberances on one surface being less than the number of protuberances on the opposed surface. In this manner the ring member is unbalanced sufficiently to predetermine the direction of dish thereof when contracted and to maintain the direction of dish constant at all times. Also, the protuberances permit only a limited movement of the ring members relative to each other.

From the broad description of our new and improved device it will be clear that one object of our invention is to provide a packing ring which furnishes an effective seal between the piston and the cylinder in which the piston reciprocates.

Another object of our invention is to provide a packing ring comprised of ring members and suitable as an oil ring.

Another object of our invention is to provide a packing ring comprised of ring members which can move relative to each other in order to remove carbon formed between the ring members and from the ring groove in which the ring is positioned.

Another object of our invention is to provide a packing ring comprised of ring members which can rotate only a limited distance relative to each other so that the gaps in the ring members cannot become aligned and permit leakage of gases and liquids past the piston.

Another object of our invention is to provide a packing ring comprised of ring members whose direction of dish may be predetermined without pre-dishing any of the ring members.

A more specific object of our invention is to provide a packing ring comprised of ring members which remain dished in the same direction when contracted on a piston reciprocating in a cylinder.

Other objects and advantages will be apparent to those skilled in the art from the following description wherein reference is made to the drawings illustrating a preferred embodiment of our invention, and wherein similar reference numerals designate similar parts throughout the several views.

One embodiment of a piston ring constructed according to our invention is shown in the drawing wherein Figs. 1 and 2 each show a vertical section of a ring installed in a ring groove.

Figure 1:
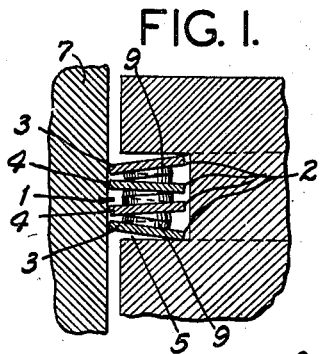

Referring to the figures the piston ring 1 is comprised of a plurality of ring members 2 including end members 3 and intermediate members 4. The end members 3 are positioned adjacent the sides of the ring groove 5, and the intermediate members 4 are placed between the end members 3.

The ring members 2 preferably are comprised of flat ribbon steel which is thin compared to its width and is bent edgewise into substantially circular shape so that the ring members assume a circular form when contracted. A gap 6 is left between the ends of each ring member so that each member may be contracted when placed in a cylinder 7, and when so contracted, each member exerts a radial force on the cylinder wall. However, the gaps 6 are large enough to permit the ring to be contracted further than is required in normal operation in a cylinder.

Figure 4:
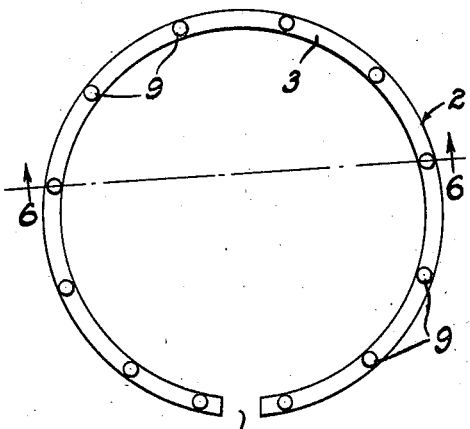
Fig. 4 is a plan view of an end ring member.
Figure 7:
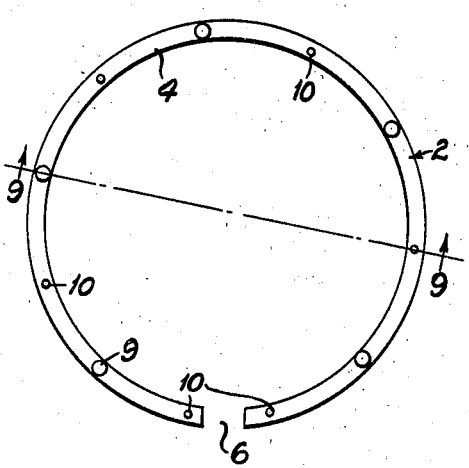
Fig. 7 is a plan view of an intermediate ring member.
Figure 5:
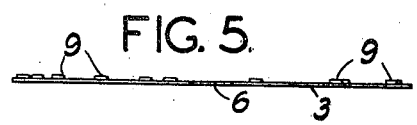
Fig. 5 is a front view thereof.
Figure 8:
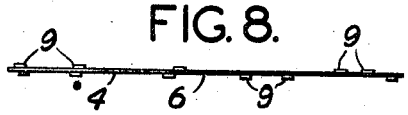
Fig. 8 is a front view thereof.
Figure 6:
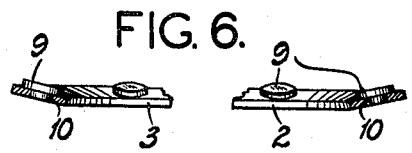
Fig. 6 is a section taken on the line 6—6 of Fig. 4 exaggerating the dishing of the ring when contracted.
Figure 9:
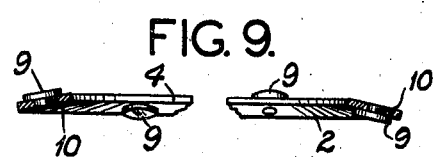
Fig. 9 is a section taken on the line 9—9 of Fig. 7 exaggerating the dishing of the ring when contracted.

Positioned at intervals on the surfaces of the ring members 2 are protuberances which, in the present embodiment, are comprised of pins 9 pressed into holes 10 in the ring members and the pins 9 protrude, preferably, an equal distance from the surface of the member. However, the protuberances may be formed integral with the ring members, as by pressing a teat thereon, or any suitable projection may be used. The end ring member 3, shown in Figs. 4, 5 and 6, has pins 9 protruding from one surface thereof, and the opposed surface is smooth for the reason hereinafter mentioned. The intermediate ring member 4 shown in Figs. 7, 8 and 9 has pins 9 protruding from two opposing surfaces thereof. However, each pin 9 on a ring member preferably protrudes from only one surface and the pins are arranged so that no two pins are in registry with each other. The number of protuberances on one surface of the intermediate members 4 is less than the number of protuberances on the opposed surface thereof. As shown in the present embodiment, one surface has positioned thereon at intervals five pins and the opposed surface has thereon six pins. The number of pins is unequal for the reasons mentioned below.

A narrow ring formed of ribbon steel compressed in a cylinder will assume a dished form. As the radius of the ring is decreased by further compression, the degree of dish increases. If the ring member is balanced, then the ring may dish in either direction, that is, either the upper or lower surface of the ring may assume a concave or convex shape. However, if the ring is unbalanced as by adding protuberances to a surface thereof, as described herein, then the ring will dish in a predetermined direction, that is, the side face of the ring adjacent the portion of greater mass will assume a concave shape and the side face of the ring adjacent the portion of lesser mass will be convex in shape. In other words, the rings dish as shown exaggerated in Figs. 6 and 9, so that the surface thereof having the least number of pins 9 is convex and the surface having the larger number of pins, therefore, is concave. Obviously, the surface of the end ring members 3 having no protuberances 9 will be convex and the opposed surface will be concave. Also, the surface of the intermediate ring member 4 having five protuberances thereon will be convex and the surface having six protuberances thereon will be concave. In this manner the direction of dish of the ring members may be predetermined, and also the degree of dish may be regulated by contracting the ring members more or less in the cylinder, or by varying the number of pins on one surface relative to the number of pins on the opposed surface of each ring member to increase or decrease the unbalancing of the ring member.

Figure 3:
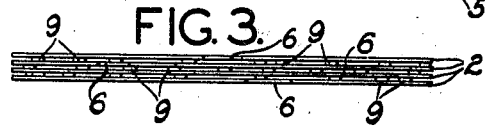
Fig. 3 shows the assembled ring members.

As shown in Fig. 3 the ring members are assembled so the gaps 6 are not in registry and each ring member is spaced laterally from the adjacent ring member a distance equal to the length of a protuberance. The protuberances 9 are arranged on the ring members so that protuberances positioned on adjacent surfaces of adjacent ring members are not in registry and so that the ring members can rotate a limited amount relative to each other.

Figure 2:
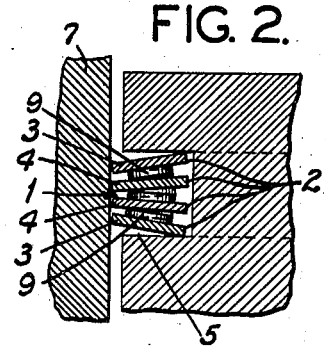

Figs. 1 and 2 show several ways of assembling the ring members 2 in a ring groove 5. The outer or end ring members 3 are placed with the smooth surfaces thereof adjacent the side of the ring groove 5 so that the ring may rotate relative to the groove. In Fig. 1 the intermediate ring members 4 are positioned in the ring groove 5 with the surfaces thereof having the larger number of protuberances positioned adjacent the outer ring members 3 so that the intermediate ring members dish in a direction opposite to that of the outer ring members.

In Fig. 2 the intermediate ring members 4 are placed in the ring groove with the surfaces of the intermediate ring members having the least number of protuberances positioned adjacent the outer ring members 3 so that the intermediate ring members dish in the same direction as the outer ring members. However, in both Figures 1 and 2 the degree of dish of the ring members is exaggerated.

The ring groove 5 preferably is formed just as wide as an integral number of assembled undished ring members 2, so that when the ring members are contracted in the ring groove a lateral force will be exerted on the members because of their dished shape. The ring groove is deep enough so that the ring members may contract considerably, if necessary, should the shape of the cylinder be slightly irregular. In the present embodiment, four ring members are shown as constituting a packing ring, but any number may be used.

The ring members 2 each presents a very small portion of its width to the cylinder wall and provides substantially a line contact therewith which furnishes a tight seal between the rings and the cylinder wall, and prevents leakage of liquids and gases past the piston. As stated above, the rings preferably are installed in the cylinder and on the piston so that a slight gap exists between the ends of the ring members when contracted in the cylinder so that the ring members may contract further should the cylinder be irregular, and for this same reason, the ring members preferably are spaced from the bottom of the ring groove.

From the foregoing description it is obvious that a ring constructed according to our invention will provide an effective seal between the plunger and the cylinder in which the plunger reciprocates. Also, the ring may be used as an oil ring and the ring members can move relative to each other in order to remove carbon between the ring member and from the ring groove in which the ring is positioned, and the relative movement of the ring members is limited so that the gaps between the ends of the ring members cannot become aligned while the ring is in operation on a piston reciprocating in a cylinder. By constructing ring members with an unequal number of protuberances on opposed surfaces thereof the direction of dish may be predetermined and the ring members will remain dished in the same direction at all times when in operation on a piston reciprocating in a cylinder. Also, the degree of dish of the ring members may be regulated by contracting the ring more or less in the cylinder, or by varying the number of protuberances on one surface relative to the number of protuberances on the opposed surface of each ring member. The rings are arranged in the ring groove so that when the ring members are contracted and therefore dished, a lateral pressure is exerted on the members which increases as the dished form assumed by the rings when contracted is increased. Obviously, an irregularity in the cylinder, such as a slight protrusion, will decrease the diameter of the ring members and increase their degree of dish, which in turn, exerts a lateral pressure on the sides of the ring groove and tends to expand the members so that the members more readily adapt themselves to the shape of the cylinder because of the increased force exerted on the ring members.

It should be remembered that the description above shows only one specific embodiment of our invention and other forms and arrangements may be used also and still come within the scope of the appended claims. For instance, the protuberances on the ring members may be formed by teats pressed from the members and in some instances it may be advantageous to position the protuberances on opposed surfaces of the intermediate ring members in registry with each other. Also, the packing ring may include a number of intermediate ring members only and the end ring members, as described above, may be eliminated from the assembly, or, a packing ring may be utilized which includes only a plurality of end ring members.

What we claim as new and desire to secure by Letters Patent, is:

1. A packing ring member thin compared to its width and composed of ribbon steel, said member having a plurality of protuberances positioned at intervals on the opposed side faces thereof, the number of protuberances on one side face of said member being less than the number of protuberances on the opposed side face thereof so that said member dishes slightly in a predetermined direction when said member is contracted in the ring groove of a piston.

2. A packing ring member thin compared to its width and composed of ribbon steel, said member having a plurality of protuberances positioned at intervals on the side faces thereof, the number of protuberances on one side face of said member being less than the number of protuberances on the other side face thereof so that said member dishes slightly in a predetermined direction when said member is contracted in the ring groove of a piston, and said member being adapted to remain dished in that same direction when in operation on a piston reciprocating in a cylinder.

3. A packing ring member composed of ribbon steel and having a plurality of protuberances positioned at intervals on the side faces thereof, the number of protuberances on one side face of said member being less than the number of protuberances on the other side face thereof so that said member dishes slightly in a predetermined direction when said member is contracted in the ring groove of a piston, and said member being flat when free.

4. A packing ring comprising a set of packing ring members and including an end member and an intermediate member, said end member having a plurality of protuberances positioned at intervals on a side face thereof and said intermediate member having a plurality of protuberances positioned at intervals on the opposed side faces thereof, the number of protuberances on one side face of said intermediate member being less than the number of protuberances on the opposed side face thereof so that said member dishes slightly in a predetermined direction when said member is contracted in the ring groove of a piston.

5. A packing ring comprising a set of packing ring members and including an end member and an intermediate member, said end member having a plurality of protuberances positioned at intervals on one side face thereof and said intermediate member having a plurality of protuberances positioned at intervals on the opposed side faces thereof, the number of protuberances on one side face of said intermediate member being less than the number of protuberances on the opposed side face thereof so that said member dishes slightly in a predetermined direction when said member is contracted in the ring groove of a piston, and said members being adapted to remain dished in that same direction when in operation on a piston reciprocating in a cylinder.

6. A packing ring comprising a set of packing ring members and including end members and an intermediate member, said end members having a plurality of protuberances positioned at intervals on a side face thereof and said intermediate member having a plurality of protuberances positioned at intervals on the opposed side faces thereof, the number of protuberances on one side face of said intermediate member being less than the number of protuberances on the opposed side face thereof so that said member dishes slightly in a predetermined direction when said member is contracted in the ring groove of a piston, and said end members and said intermediate member being flat when free.

DALLAS M. SMITH.
WALTER C. KNOEBEL.